(12) United States Patent
Hunt et al.

(10) Patent No.: US 8,442,540 B2
(45) Date of Patent: May 14, 2013

(54) METHOD FOR ALLOCATING RESOURCES

(75) Inventors: Bernard Hunt, Redhill (GB);
Ludovicus M. G. M. Tolhuizen,
Eindhoven (NL); Timothy J. Moulsley,
Caterham (GB)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 98 days.

(21) Appl. No.: 12/865,462

(22) PCT Filed: Jan. 29, 2009

(86) PCT No.: PCT/IB2009/050358
§ 371 (c)(1),
(2), (4) Date: Jul. 30, 2010

(87) PCT Pub. No.: WO2009/098615
PCT Pub. Date: Aug. 13, 2009

(65) Prior Publication Data
US 2010/0323740 A1 Dec. 23, 2010

(30) Foreign Application Priority Data
Feb. 6, 2008 (EP) .................................. 08305017

(51) Int. Cl.
*H04W 72/00* (2009.01)
(52) U.S. Cl.
USPC ........ 455/450; 455/466; 455/451; 455/452.1; 455/453; 455/455

(58) Field of Classification Search ........... 455/446–455
See application file for complete search history.

(56) References Cited

U.S. PATENT DOCUMENTS

| | | | |
|---|---|---|---|
| 6,882,847 B2 | 4/2005 | Craig et al. | |
| 2004/0203806 A1* | 10/2004 | Craig et al. | 455/450 |
| 2007/0206559 A1 | 9/2007 | Cho et al. | |

FOREIGN PATENT DOCUMENTS

| | | |
|---|---|---|
| CN | 101039500 A | 9/2007 |
| EP | 1758327 A2 | 2/2007 |
| EP | 1819118 A2 | 8/2007 |
| WO | 2007044173 A2 | 4/2007 |

* cited by examiner

Primary Examiner — Fayyaz Alam

(57) ABSTRACT

The present invention relates to a method for allocating resources to a plurality of secondary stations for enabling communication between a primary station and the plurality of secondary stations, comprising the steps of a) grouping the resources into at least a first set of resources and a second set of resources; b) allocating a first resource of the first set of resources to a first secondary station, said first resource having a first index in the first set of resources; c) allocating a second resource of the second set of resources to the first secondary station, said second resource having a second index in the second set of resources being equal to the first index plus an offset based at least partly on other information known to the primary and first secondary station.

12 Claims, 3 Drawing Sheets

METHOD FOR ALLOCATING RESOURCES

FIELD OF THE INVENTION

The present invention relates to a method for allocating resources in communication network comprising a primary station and a plurality of secondary stations.

This invention is, for example, relevant for Mobile Telecommunication networks like UMTS or any communication network where some resources have to be allocated.

BACKGROUND OF THE INVENTION

In communication systems operating over a bandwidth, the transmission quality depends over the frequency and over the time. Given a system with a sufficiently wide bandwidth, different frequencies within the system may provide different capacity between particular nodes of the system, at any one time. Typically frequencies close together will have similar capacity, and those spaced further apart may have different capabilities.

Ideally, channel knowledge (e.g. obtained from measuring the reception of known reference signals) is used to identify the better frequencies on which to communicate between a given set of nodes at a given time. However this creates a number of system overheads in terms of transmission of reference signals and exchange of measurement information between nodes.

In some cases, transmissions should be scheduled without knowledge of which frequencies will give the better performance. In these instances, it can be advantageous to make use of frequency diversity, that is, scheduling the transmissions across a number of different frequencies, where the chosen frequencies for a given allocation are somewhat separated. In some cases there may be limited information on channel performance, which is sufficient to allow choice of transmission formats (e.g. modulation and coding schemes) to be used for transmissions on particular frequencies, but which is not sufficient to make choices on which frequencies should be scheduled to which allocations.

Such scheduling of allocations may be fixed, or may be adaptive. In either case, the receiving node needs to have knowledge of the scheduling being used for its transmissions at any given time, in order to be able to successfully receive and decode the transmission.

In order to achieve best system performance, a distributed scheduling allocation needs to optimise against two different criteria. One is the frequency separation achieved within any allocation, which should be as large as possible, given the available resource units to be able to test over a large band of frequency. The other criterion is the amount of signalling required to enable the receiving node to identify the location of the transmissions is it intended to receive, which should be minimised.

A fixed scheduling has the advantage that minimal extra signalling is required. In fixed scheduling, a plurality of sets of resources blocks are predetermined, and the only signalling required for each node is an indication of which set of resource blocks has been allocated to this node. The main disadvantage of fixed scheduling is that the frequency separation also must be fixed and cannot be optimised according to the system load. Typically, the separation is set at half the maximum possible separation—which provides optimal separation under fully loaded conditions, but suboptimal separation under other conditions.

A known variation of fixed scheduling is mirrored allocations, where the available lower frequency resource block is paired with the available higher frequency resource block, the second lower frequency resource block with the second higher frequency resource block etc. However, as the loading increases, allocations come closer to the middle of the frequency band, ultimately with the neighbouring frequencies in the middle of the band being scheduled together as a single allocation. This negates the benefit of frequency diversity in these middle regions, and additionally provides a different separation for each allocation, leading to inconsistent performance across allocations.

On the contrary, free scheduling can provide optimal frequency separation. In this case, there are no pre-constraints on the identification of allocations, so these can be made with total freedom at the transmitting node. However, in order for the receiving node to operate, it is necessary to signal the details of the components of every allocation to the receiving node. In the case where comparatively small amounts of useful data are being scheduled, the overheads due to this signalling may remove any system benefits due to the improved radio performance.

SUMMARY OF THE INVENTION

An aim of the invention is to provide a method for allocating resources which solves the above mentioned problems.

Another aim of the invention is to provide a method which enables a good trade-off of signalling amount and flexibility.

To this end, according to a first aspect of the invention, it is proposed a method for allocating resources to a plurality of secondary stations for enabling communication between a primary station and the plurality of secondary stations, comprising the steps of grouping the resources into at least a first set of resources and a second set of resources; allocating a first resource of the first set of resources to a first secondary station, said first resource having a first index in the first set of resources; allocating a second resource of the second set of resources to the first secondary station, said second resource having a second index in the second set of resources being equal to the first index plus an offset based at least partly on other information known to the primary and/or the first secondary station.

As a consequence, this method allows an optimal frequency separation for the different parts of a scheduled allocation to be calculated, given the number of resource units used for an allocation, the number of allocations required to be made, and the number of available resource units. Further developments of the algorithm account for different techniques to reserve resource blocks such that they are not available for this scheduling process, and may be used elsewhere in the system. By considering the inputs required for the implementation of this method, it can be seen how a reduced signalling load is required whilst still providing optimal frequency separation.

The present invention also relates to a primary station comprising means for carrying out the method according to the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for allocating resources in a telecommunication network, and is more especially dedicated to a mobile telecommunication network as GSM or UMTS. In such a network, a base station or a primary station communicates with a plurality of mobile stations or secondary stations through a plurality of channels.

Figure 1:
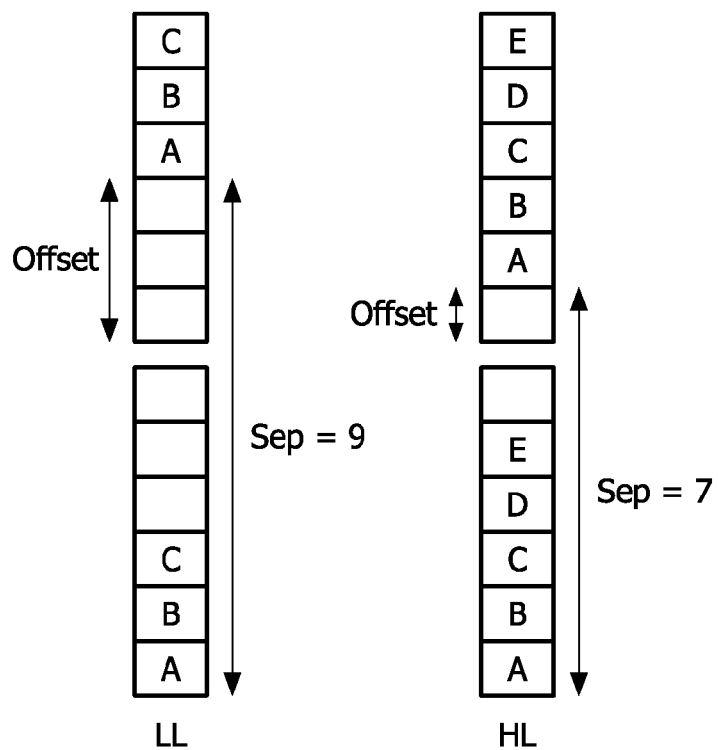
FIG. 1 is a block diagram representing in schematic manner the allocation of resources in accordance with a first embodiment of the invention.

FIG. 1 illustrates a first example of embodiment of the invention. In this scheme, each allocation consists of a pair of resource blocks, and it is considered that one resource block is normalised to one unit of frequency, hence descriptions in terms of frequency actually refer to resource unit numbering and location, allowing for use of easily understood terms such as bandwidth. However, the resource could be another parameter than frequency. For simplicity of explanation, it is also considered that the resource units are identified in a continuous set of neighbouring frequencies. In practice this may not always be the case, but the invention still applies as will be seen below.

From a system point of view, the ideal allocation of pairs will give the same spacing between elements of a pair, for all pairs. And this spacing will be the maximum possible, given the number of pairs requiring allocation, and the available resource units.

This can be achieved by using a scheme based on the known Fixed Separation scheme, with the addition of an offset. On FIG. 1, it can be seen that for the case of Low Load (LL), the secondary stations A, B and C have allocated pairs of resource blocks separated by 9 resource blocks and for the case of High Load (HL), the separation is of 7 blocks. For each considered secondary station, the second resource block can be deduced from the first resource block by offsetting the index of the first resource block with an offset. BW/2 is the ideal separation in the case of full loading, where BW is the number of resource block, in the case of non-full loading the offset allows unused resource elements at the edge of the band to be moved to the centre of the band, increasing the separation between elements of pairs.

If we assume all resource units in the band are available for scheduling in this function, the separation between elements of a pair can be given by the equation:

$$Sep = \text{floor}\left(\frac{BW}{2} + \text{Offset}\right),$$

where BW is the number of available resource blocks, floor is the function such that for any x, with n≦x<n+1, floor(x)=n, and Offset is given by $$\text{Offset} = \text{floor}\left(\frac{BW}{2} - N_{Grp}\right),$$

where $N_{Grp}$ is the number of groups of secondary stations requiring an allocation. Here, each group comprises one secondary station, but as will be seen below, the secondary stations may be grouped in groups of several secondary stations.

Figure 2:
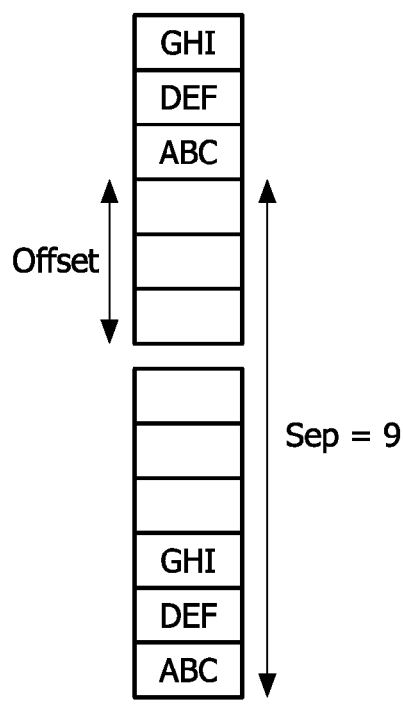
FIG. 2 is a block diagram representing in schematic manner the allocation of resources in accordance with a variant of the first embodiment of the invention.

FIG. 2 illustrates the case where the secondary stations are grouped into groups of 3 secondary stations. The same reasoning however remains. Multiple allocations may share each resource. For example, the generalised algorithm described above can be applied to allocations of a size corresponding to a single resource unit, which for each allocation is split and transmitted in n different resource units. This allows n allocations to share the same set of resource units, for example in a time-division-multiplexed manner within each resource unit, with an additional signalled parameter for each allocation to indicate in which place the allocation is situated first resource unit. This is shown below by way of example for the case of n=3.

In these embodiments, the algorithm can be used for allocating each resource from a set of resources to multiple recipients or single recipients, where the multiple recipients are multiplexed within the resource, for example in a time-, code- or spatial-multiplexed manner.

Figure 3:
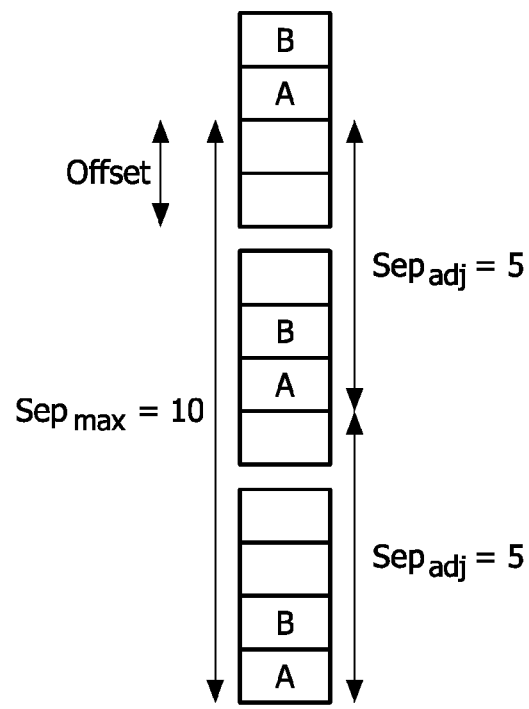
FIG. 3 is a block diagram representing in schematic manner the allocation of resources in accordance with a second embodiment of the invention.

FIG. 3 illustrates the case of a division of the bandwidth into three sets of resource blocks, and each secondary station is allocated to a set of three resources. This allocation is done as follows. First element of the triplet is allocated and signalled in the same way as for pairs, except that possible allocations are restricted to one third of the band, rather than half. Amount of signalling is the same as for pairs (same number of bits), if total number of resource units is approximately a power of 2. (There is a possible saving of one signalling bit for some values of the total number of resource units.)

Third element of the triplet is allocated in relation to first element in exactly the same way as for pair allocations.

The middle element of the triplet is allocated half way in-between first and third elements (exactly in-between, or with an offset of 1 in case of even number of resource elements between first and third elements. Offset can be + or −1, but should be consistent).

The equations introduced above can be generalised to an allocation of n resource blocks as follows.

The separation between the most distant elements of an allocation is given by:

where the spacing given is that between adjacent elements of the group.

$$Sep_{max} = \text{floor}\left((n-1)\frac{BW}{n} + \text{Offset}\right);$$

where $$\text{Offset} = \text{floor}\left(\frac{BW}{n} - N_{Grp}\right),$$

and where n is the number of resource blocks per allocation.

The separation between adjacent elements of an allocation is given by:

$$Sep_{adj} = \text{floor}\left(\frac{Sep_{max}}{n-1}\right).$$

In another embodiment, some resource blocks may not be available, because they are reserved, it is required to take that into account. In accordance with this embodiment of the invention, a first step of the method is to check whether some resource blocks are reserved and exclude them from the rest of the method. Thus, the indexation will take these into account, which can be ignored for the computation of the offset.

However, if these reserved blocks are not ignored, we modify the offset as:

$$\text{Offset} = \text{floor}\left(\frac{BW}{n} - N_{Grp} - \frac{N_{res}}{n}\right),$$

where $N_{res}$ is the number of reserved resource blocks.

In terms of signalling, it is necessary to signal the location of one element of each pair, and an additional term which can be used as the offset value, or to calculate the offset value. Typically the bandwidth will be fixed, or only vary on a long timescale, so does not need to be signalled frequently. The maximum number of allocations required and number of reserved blocks may change more frequently. It is possible to choose the signalling frequency so as to optimise the trade-off between optimal performance and signalling overhead—less frequent signalling can be used, where the value signalled is the maximum which will occur until the next signalling. If, during the time period, the actual number of allocations is less than the maximum, there will be a slight decrease in the pair separation compared to the maximum achievable for the instantaneous number of allocations.

In a second embodiment of the invention, some resources may be reserved for specific secondary stations for a relatively long period of time. As an example, a mobile station may need several resources for transmitting or receiving a large amount of data. In such a case, an allocation can be scheduled for several time frames. The reserved block may be the same for several time frames or varying according to a predetermined pattern.

Figure 4:
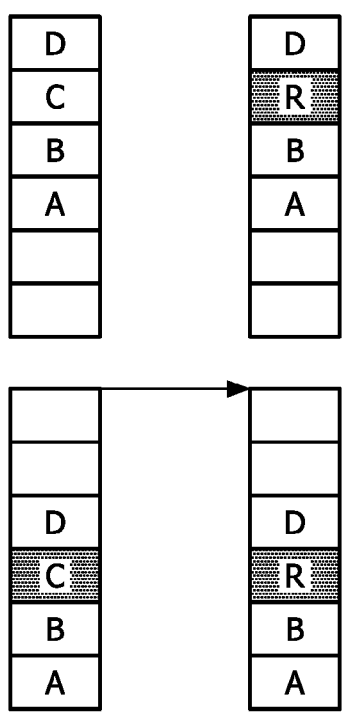
FIG. 4 is a block diagram representing in schematic manner the allocation of resources in accordance with a third embodiment of the invention.

FIG. 4 illustrates a first variant of this embodiment taking into account the reserved blocks. It is based on dummy allocation of resource. One simple approach to making reserved blocks is to create one or more "dummy" allocations. Allocations made as normal (according to the algorithm), but not assigned to any users by this system function, can then be used by some other system function. The main advantage is that no extra signalling is required. However, the granularity of number of reserved blocks is constrained according to the allocation grouping (e.g. pairs, triplets, n-uplets) and the location of reserved blocks is not fully flexible—only one out of every [pair/triplet] can be freely placed—the others are located according to the algorithm.

On FIG. 4, three secondary stations A, B and D require an allocation and the third resource block of the first set of resource blocks has been reserved for a specific secondary station C. Then, according to this particular variant of the invention, the allocation is carried out according to the first embodiment of the invention as if the specific secondary station needed a pair of resource blocks comprising the third resource block and another, determined by the above described method, here the fifth of the second set. The fifth block of the second set may not be allocated to the secondary station C but can be kept for other purposes.

Figure 5:
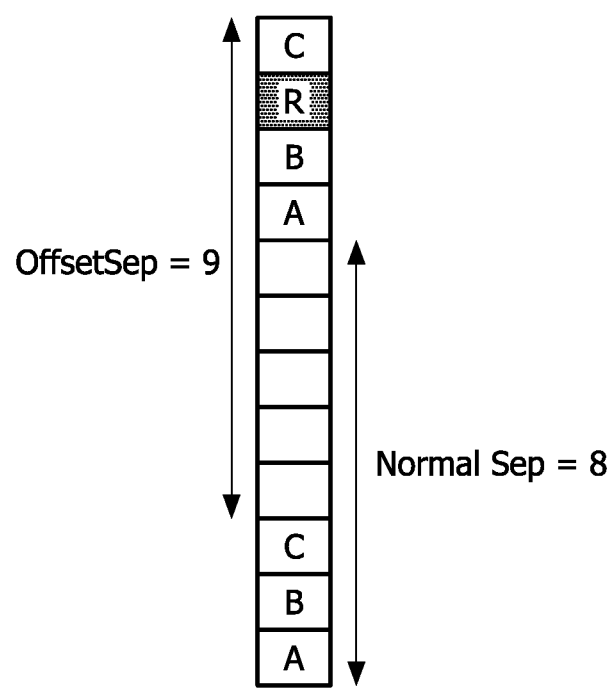
FIG. 5 is a block diagram representing in schematic manner the allocation of resources in accordance with the third embodiment of the invention.

In another variant of this embodiment, reserved blocks can be placed anywhere, before the allocation of resource elements to pairs, triplets, etc. and allocations of resource elements to pairs, triplets etc. is made as normal (according to the generalised algorithm). However, where one or more reserved blocks fall between two elements of the same allocation, the separation is increased according to this number of reserved blocks, as can be seen on FIG. 5.

This additional offset value is signalled for each affected allocation, in addition to the normal signalling for the scheme. The main advantages are the full flexibility over number and placement of reserved blocks and less signalling overhead than signalling location of all group elements, or absolute separation distances (assuming majority of band is used for distributed scheduling, not reserved blocks). However, it requires increased signalling compared to no reserved blocks, or dummy allocations.

In another variant of the invention, and in the event of semi-static reservations, reserved blocks can be removed from the set of available resource units, with the remaining units being renumbered or reindexed. The algorithm is then applied to new "raster" of resource units, with no modification. A "semi-static" reservation could also be one which changes with time, according to a predetermined (and known) pattern, such that signalling of changes is not required. An example would be one where there is a fixed frequency hopping pattern of allocations. Low rate signalling (could be broadcast, or point to point, could be at "call set up" etc.) is used to signal the changes to the raster, or could also be used to switch between a small set of preconfigured rasters. The main advantage is that it allows full flexibility over number and placement of reserved blocks, and relatively low increase in signalling overhead. However, signalling efficiency is only gained in case of semi-static reservations.

A non-continuous raster may also apply as the basic set of resource units originally available for frequency diversity scheduling. In some cases it may not be necessary to signal the presence and location of "gaps" in the raster.

Two examples are:

1. In UMTS LTE there exist broadcast control channels, sent from the transmitting base station. The location of these is known to the receiving terminals. Hence the terminals may discount these from the raster without any specific signalling to do so.

2. In some cases, the transmitting node may request limited channel quality information from terminals in order to choose between different transmission formats (modulation, coding etc.), while not obtaining sufficient information to choose between different frequencies for scheduled allocations. Such information may be requested for only a subset of possible frequencies, rather than all frequencies. Here it may be assumed that the frequencies for which this limited channel quality information is requested are those which make up the "raster" of available resource units, without the need for extra signalling to identify this raster.

Further modifications to the "raster" are possible, but would require the extra signalling.

This invention offers particular benefit in a system with a broadcast channel which can signal the fixed or slowly varying parameters which are need to calculate a resource allocation to all the users in the system (e.g. system bandwidth, reserved blocks, number of distributed allocations). This means that such parameters would not need to be signalled individually to each user, thus saving signalling overhead.

In any embodiment, more than one of the allocations may be assigned to a single user. In this case, all but one of the allocations may be signalled by means of an offset from the first allocation.

It is to be noted that the present invention is not limited to the examples described above and can be adapted. For instance, it is to be understood that in some adaptations, the role of the primary station may be a mobile station and the secondary station may be a base station. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfill the functions of several items recited in the claims. The mere fact that certain measures are recited in mutually different dependent claims does not indicate that a combination of these measured cannot be used to advantage.

The invention claimed is:

1. A method for allocating resources to a plurality of secondary stations for enabling communication between a primary station and the plurality of secondary stations, comprising the steps of
   a) grouping the resources into at least a first set of resources and a second set of resources;
   b) allocating a first resource of the first set of resources to a first group of secondary stations comprising at least one secondary station, said first resource having a first index in the first set of resources;
   allocating a second resource of the second set of resources to the first group of secondary stations, said second resource having a second index in the second set of resources, said second index being equal to the first index plus an offset, said offset given by:

$$\text{Offset} = \text{floor}\left(\frac{BW}{n} - N_{Grp}\right);$$

where BW is a number of available resources,
n is a number of resources allocated to each secondary station, and
$N_{Grp}$ is a number of groups of secondary stations.

2. A method for allocating resources to a plurality of secondary stations for enabling communication between a primary station and the plurality of secondary stations, comprising the steps of
   a) grouping the resources into at least a first set of resources and a second set of resources;
   b) allocating a first resource of the first set of resources to a first group of secondary stations comprising at least one secondary station, said first resource having a first index in the first set of resources;
   c) allocating a second resource of the second set of resources to the first group of secondary stations, said second resource having a second index in the second set of resources, said second index being equal to the first offset plus an offset, said offset being based on information comprising at least a number of resources allocated to each secondary station; and
   d) allocating a third resource of the third set of resources to the first group of secondary stations, said third resource having a third index in the third set of resources, wherein the number of resources between the first resource and the third resource equals $$\text{floor}\left(\frac{BW - N_{Grp}}{n - 1}\right),$$

where BW is a number of available resources,
n is a number of resources allocated to each secondary station, and
$N_{Grp}$ is a number of groups of secondary stations.

3. A primary station comprising:
means for allocating resources to a plurality of secondary stations for enabling communication between the primary station and the plurality of secondary stations;
means for grouping the resources into at least a first set of resources and a second set of resources;
means for allocating a first resource of the first set of resources to a first secondary station, said first resource having a first index in the first set of resources;
means for allocating a second resource of the second set of resources to the first secondary station, said second resource having a second index in the second set of resources, said second index being equal to the first index plus an offset, said offset given by:

$$\text{Offset} = \text{floor}\left(\frac{BW}{n} - N_{Grp}\right);$$

where BW is a number of available resources,
n is a number of resources allocated to each secondary station, and
$N_{Grp}$ is a number of groups of secondary stations.

4. A primary station comprising:
means for allocating resources to a plurality of secondary stations for enabling communication between the primary station and the plurality of secondary stations;
means for grouping the resources into at least a first set of resources and a second set of resources;
means for allocating a first resource of the first set of resources to a first secondary station, said first resource having a first index in the first set of resources;
means for allocating a second resource of the second set of resources to the first secondary station, said second resource having a second index in the second set of resources, said second index being equal to the first index plus an offset, said offset being based on information comprising at least a number of resources allocated to each secondary station;
means for allocating a third resource of the third set of resources to the first group of secondary station, said third resource having a third index in the third set of resources, wherein the number of resources between the first resource and the third resource equals $$\text{floor}\left(\frac{BW - N_{Grp}}{n - 1}\right),$$

where BW is a number of available resources,
n is a number of resources allocated to each secondary station, and
$N_{Grp}$ is a number of groups of secondary stations.

5. The primary station of claim 3 wherein the information includes at least one of: a number of secondary stations, and a set of resources which are not available.

6. The primary station of claim 3 wherein the information includes a set of resources for at least one of the first group of secondary stations reports the corresponding channel state or channel quality information.

7. The primary station of claim 3, wherein the first set of resources is a lower frequency set of resources, and wherein the second set of resources is a higher frequency set of resources.

8. The primary station of claim 7, wherein the means for allocating resources allocates the resources by grouping the available resources into the first set of resources, the second set of resources and at least one third set of resources, the at least one third set of resources is an intermediate frequency set of resources.

9. The primary station of claim 3, wherein the offset is signaled to each secondary station.

10. The primary station of claim 3, the information is signaled to each secondary station.

11. The primary station of claim 3, wherein for each resource, the resource is checked to determine whether it is available, and if not, the resource is excluded from the resource allocation.

12. The primary station of claim 11, wherein the secondary stations are signaled an indication that the excluded resources are excluded.

* * * * *